United States Patent [19]
Barnett

[11] 3,816,652
[45] June 11, 1974

[54] LASER FACSIMILE TRANSCEIVER

[76] Inventor: George D. Barnett, Quarters 383D, MCB,, Quantico, Va. 22134

[22] Filed: July 26, 1971

[21] Appl. No.: 165,906

[52] U.S. Cl. .................................. 178/7.6, 346/76 L
[51] Int. Cl. .................................................. H04n 1/04
[58] Field of Search.........178/7.6, 7.1, 7.2, DIG. 27; 346/76 L, 108; 350/6, 7, 285

[56] References Cited

UNITED STATES PATENTS

| | | | |
|---|---|---|---|
| 1,740,490 | 12/1929 | Wright et al. | 178/DIG. 27 |
| 1,792,264 | 2/1931 | Alexanderson | 346/108 |
| 3,316,348 | 4/1967 | Hufnagel et al. | 178/7.6 |
| 3,426,144 | 2/1969 | Roth | 178/7.6 |
| 3,457,422 | 7/1969 | Rottmann | 350/6 |
| 3,465,352 | 9/1969 | Carlson et al. | 346/108 |
| 3,529,884 | 9/1970 | Ives et al. | 350/7 |
| 3,574,469 | 4/1971 | Emerson | 178/7.6 |
| 3,610,824 | 10/1971 | Hansen et al. | 178/7.6 |

OTHER PUBLICATIONS

Latta, Laser Raster Scanner, IBM Tech. Disclosure Bulletin, Vol. 13, No. 12, May 1971, pp. 3,879–3,880.

*Primary Examiner*—Robert L. Griffin
*Assistant Examiner*—George G. Stellar
*Attorney, Agent, or Firm*—Anthony A. O'Brien

[57] ABSTRACT

A facsimile transceiver in which a beam of coherent radiation, as from a laser, is split into two separate parallel beams which are angularly directed against two sides of a single polygonal rotating mirror such that two divergent scanning beams are produced for reading a send document and printing a receiving document, singly or simultaneously.

2 Claims, 5 Drawing Figures

INVENTOR,
George D. Barnett
BY Brenner, O'Brien & Guay
ATTORNEYS

PATENTED JUN 11 1974 3,816,652

SHEET 2 OF 2

INVENTOR,
George D. Barnett

BY Brenner, O'Brien & Guay
ATTORNEYS

LASER FACSIMILE TRANSCEIVER

BACKGROUND OF THE INVENTION

1. Field of the Invention

The present invention relates to facsimile transceivers and more particularly to a laser facsimile transceiver utilizing a single polygonal scanning mirror in conjunction with a single laser device.

2. Description of the Prior Art

With the advent of refined techniques and modern equipment for rapid processing and communication of information over long distances, a need has developed for a two-way terminal unit or transceiver which can quickly read or accept information to be processed for transmission and can also develop a permanent visually perceptible record of processed information which has been received. The popularity of the laser as a scanning device has naturally led to its use in systems designed to fill this need; however, typical transceivers which have heretofore been developed have only been partially successful and have not met with widespread commercial acceptance.

The prior art, as exemplified by U.S. Pat. Nos. 3,154,371 and 3,316,348, is generally cognizant of facsimile systems utilizing laser scanning; however, such systems have generally proven to be highly complex and economically impractical. More specifically, prior transceivers capable of simultaneous transmission and reception have required two separate scanning devices, normally of the rotating mirror type, one for "reading" or transmission and another for "printing" or reception. It is well-known that the rotating mirror, with its polygonal shape and finely polished sides, is a major cost factor in the production of any laser scanning device, and the need for two such mirrors has generally resulted in the total cost of these prior art transceivers being beyond their marketable value. These two problems, namely complexity and cost, are exemplary of many of the serious disadvantages which, heretofore, had not been effectively overcome.

SUMMARY OF THE INVENTION

It is therefore an object of the present invention to construct a laser facsimile transceiver which utilizes a single scanning mirror for both transmission and reception.

The present invention is summarized in that a facsimile transceiver includes a rotatable polygonal mirror (a) for reflecting a first beam modulated by incoming information against a receiving document and (b) for reflecting a second beam against a send document having outgoing information to generate outgoing signals on sensing facilities. Sync facilities, responsive to receiving and transmitting facilities, operate rotating facilities for the mirror to (a) record incoming information, (b) transmit outgoing information or (c) simultaneously record incoming information and transmit outgoing information.

Another object of this invention is to construct a laser transceiver having only a single laser and a single scanning mirror and capable of simultaneously scanning or reading a send document for transmission, and recording on a receiving document information which is being received.

Further objects and advantages of the present invention will become apparent from the following description of the preferred embodiment when taken in conjunction with the accompanying drawings.

DESCRIPTION OF THE PREFERRED EMBODIMENT

Figure 1:
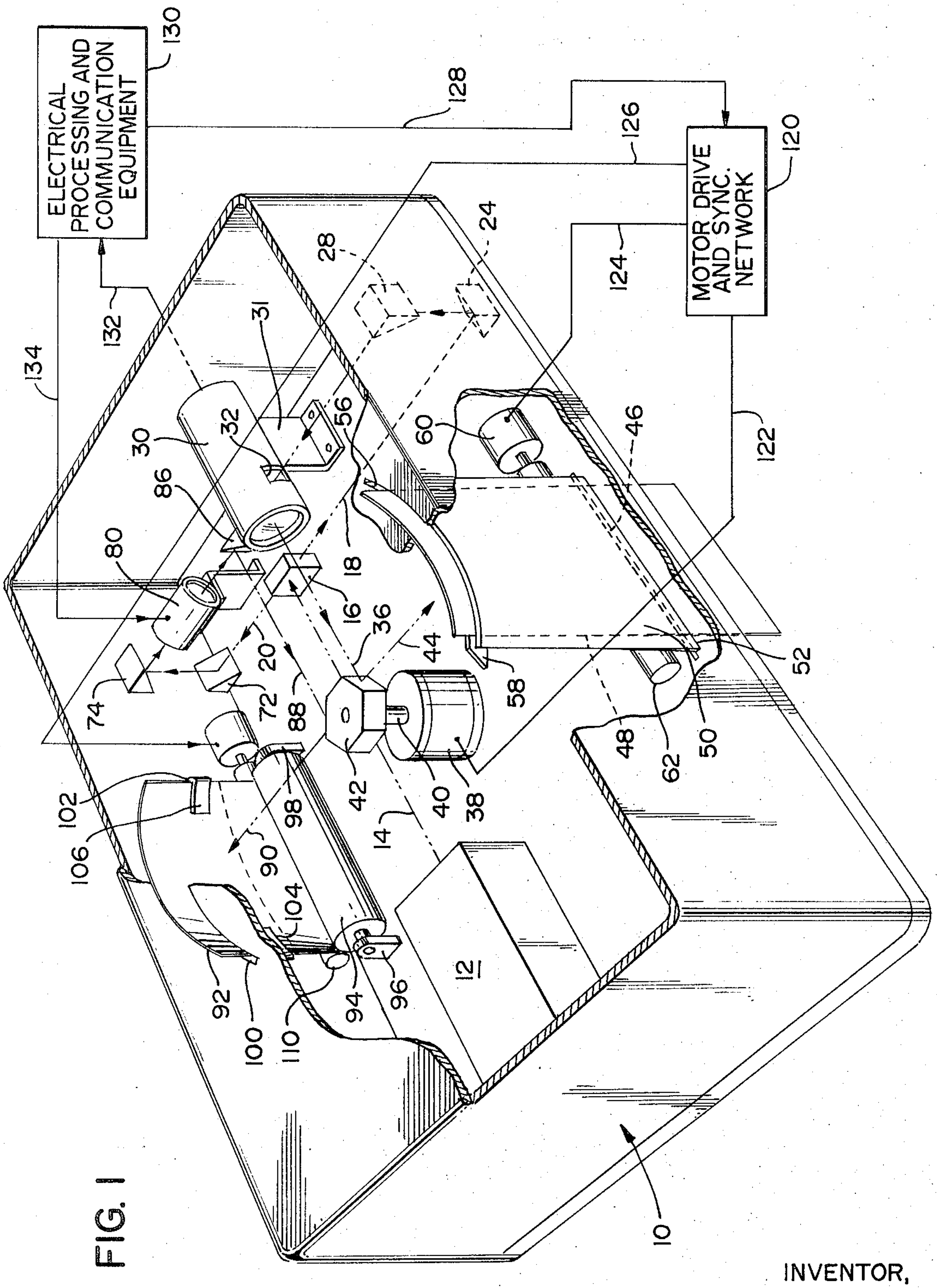
FIG. 1 is a perspective view, partially broken away and partially in block diagram form, of a preferred embodiment of a laser facsimile transceiver according to the present invention.
Figure 2:
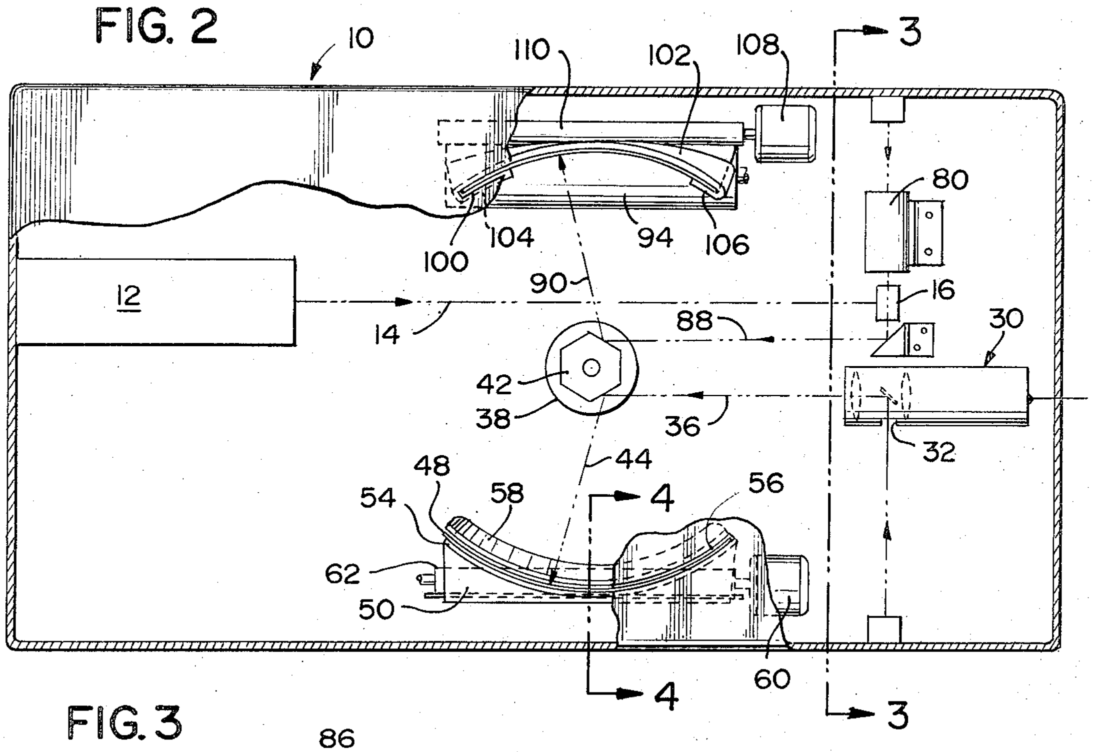
FIG. 2 is a top plan view of the transceiver of FIG. 1 with parts broken away.
Figures 3, 4, 5:
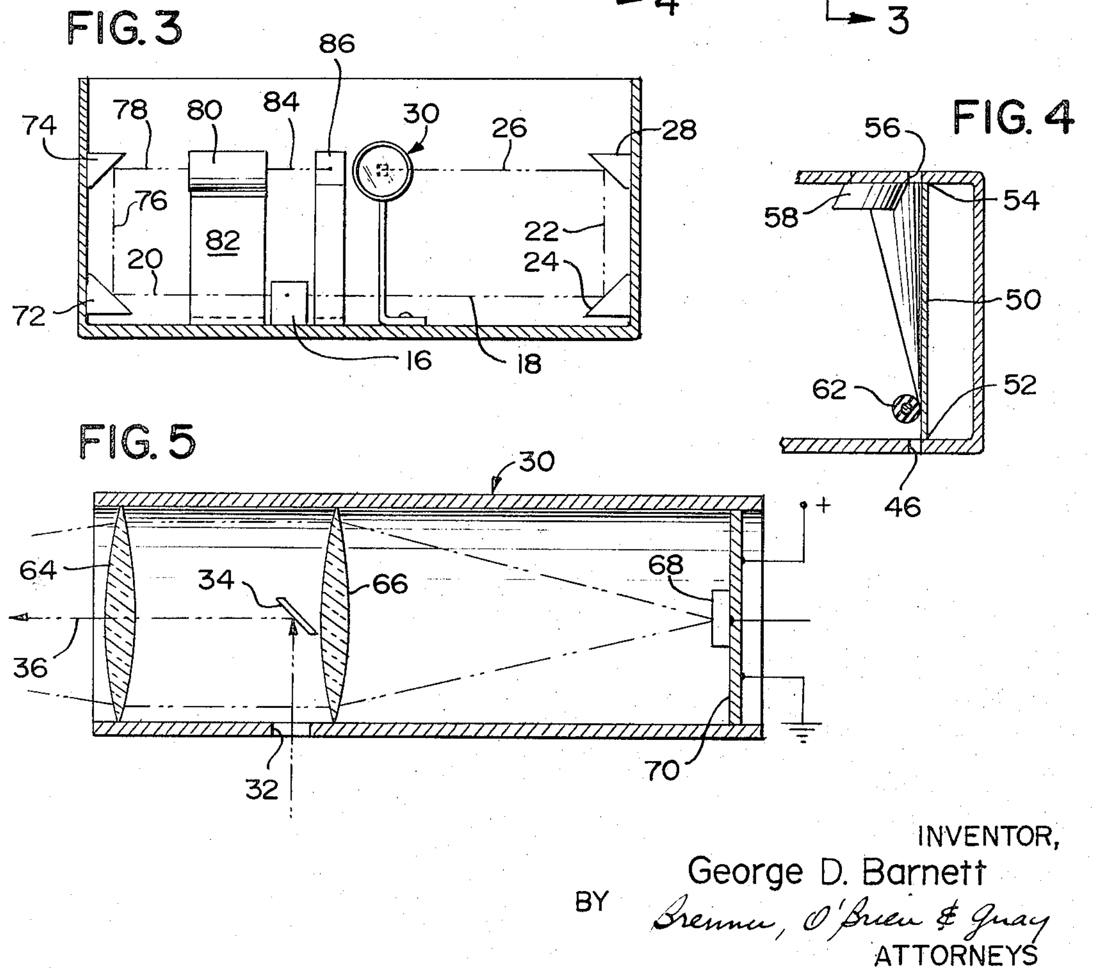
FIG. 3 is a sectional view taken along line 3—3 of FIG. 2.
FIG. 4 is a sectional view of a detail of the transceiver of FIG. 1 taken along line 4—4 of FIG. 2.
FIG. 5 is a horizontal sectional view of a detail of the lens capsule of the transceiver of FIG. 1.

Referring to FIGS. 1–5, one embodiment of a laser facsimile transceiver according to the present invention includes a housing 10 which may be of any suitable design and is preferrably closed on all sides to protect the various components contained therein from damage. A suitable source of coherent radiation such as a helium neon laser 12 is mounted on the floor of housing 10 toward the left side thereof as viewed in FIG. 1. Laser 12 is oriented so as to direct an output beam of light 14 longitudinally across the housing parallel to and spaced from the housing center-line as shown in FIG. 2. A beam-splitter 16 is mounted to the floor of the housing adjacent the right side thereof and is disposed to intercept the output beam 14 from laser 12. The beam-splitter 16 may be of any well-known type and thus will not be described in detail for the sake of brevity.

The output beam 14 from laser 12 is split by beam-splitter 16 into two oppositely directed beams 18 and 20 which are each perpendicular to light beam 14 and extend transversely across the housing 10 parallel with the plane of the floor thereof. Beam 18 is reflected upwardly as beam 22 by a mirror 24 which is affixed to a lower corner of housing 10 at a 45° angle with respect to the line of propagation of beam 18. The upwardly reflected beam 22 is again reflected as beam 26 by another mirror 28 which is mounted in superposition with mirror 24 on the side wall of housing 10. Mirror 28 also is disposed at a 45° angle so as to direct beam 26 back toward the center of the housing in parallel with beam 18.

A cylindrical lens capsule, indicated generally at 30, is mounted upon a support 31 from the floor of housing 10 with its focal axis longitudinally oriented in the housing adjacent the longitudinal center-line thereof. The focal axis of capsule 30 is also disposed in the horizontal plane of beam 26 with the capsule axis and beam 26 orthogonally related. Capsule 30 defines an aperture 32 in the front side thereof for permitting beam 26 to enter the capsule where it impinges upon a vertical mirror 34 oriented at a 45° angle with respect to beam 26 and centered upon the focal axis of capsule 30. Beam 26 is thus reflected by mirror 34 out of capsule 30 along its focal axis as beam 36.

A motor 38 mounted with its shaft 40 disposed vertically on the longitudinal center-line of housing 10 supports a polygonal mirror such as hexagonal polished mirror 42 for rotation in a horizontal plane. The reflecting side surfaces of the mirror are parallel to the axis of rotation of the mirror. The height of mirror 42 above the floor of the housing is such that beam 36 from the capsule 30 impinges against the polished, reflecting side surfaces thereof as it is rotated. Due to the off-center disposition of capsule 30, beam 36 approaches the mirror side surfaces angularly whereupon a reflected beam 44 is caused to repetatively sweep through a predetermined horizontal arc as mirror 42 is rotated by the motor 38.

A straight longitudinal slot 46 is defined in the floor of housing 10 for accommodating a send document 48 which is fed upwardly into the housing. A generally rectangular guide plate 50 has a straight bottom edge 52 and is bent so that its upper edge 54 defines a circular arc. The straight edge 52 of plate 50 is attached by any suitable means to the front edge of slot 46, and the curved edge 54 is likewise attached to the front edge of an arcuate slot 56 in the top of housing 10. A curved, elongated plate 58 is affixed to the rear edge of slot 58 at a slight angle to the vertical so as to form a guide lip for the send document 48. As shown in FIG. 2, slot 56 and edge 54 of plate 50 form a circular arc having its center located at the center of shaft 40 for mirror 42.

A stepping motor 60 is mounted adjacent the floor of housing 10 and is operatively connected with a roller 62 which may be constructed of a somewhat resilient material and which presses against the lower end of plate 50 so as to grasp and sequentially move document 48 upwardly through the housing.

Beam 44, which is swept in a circular arc by rotating mirror 42, impinges against document 48 containing outgoing information and is reflected thereby back against mirror 42 and into capsule 30. A pair of suitable focusing lenses 64 and 66 are mounted in spaced relation in the lens capsule so as to focus the returned beam upon a photodiode 68. Photodiode 68 is part of a photoelectric assembly, indicated generally at 70, which may be of any suitable type and is mounted so as to close off the end of lens capsule 30.

Beam 20 from beam splitter 16 is directed against a pair of mirrors 72 and 74 which are mounted on the rear wall of housing 10 in a similar manner to that of mirrors 24 and 28. Thus, beam 20 is reflected by mirror 72 upwardly as beam 76, and beam 76 is further reflected by mirror 74 as beam 78. Beam 78 is directed through a light modulator 80 which is mounted on a support 82 from the floor of housing 10 directly over the path of beam 20. Light modulator 80 may be of any well-known type and thus need not be described in detail. The modulated output beam 84 from modulator 80 impinges upon a vertical mirror 86 which is attached to the housing at a 45 degree angle to the beam 84. Mirror 86 is mounted slightly to the rear of the longitudinal center-line of housing 10 so as to reflect the beam 84 as beam 88 parallel to beam 36 against the rotating mirror 42. As shown in FIG. 2, beam 88 is angularly directed against a side of mirror 42 such that as the mirror rotates, beam 90, divergent from beam 44, is swept across a circular arc in a horizontal plane.

Beam 90 impinges upon a receiving document such as a strip of film or a sheet of paper 92 which is treated so as to exhibit photosensitive characteristics to record incoming information. In other words, as the modulated light beam sweeps across sheet 92, the information carried by the modulated beam causes the development of light and dark areas by photo-chemical reactions which occur directly in the film or paper. The sheet 92 is stored in a roll 94 which is journalled for rotation upon a pair of upstanding supports 92 and 98 attached to the floor of the housing. A curved slot 100 is formed in the top of housing 10 above roll 94 for enabling sheet 92 to be withdrawn from the housing after a message has been received and "printed". Slot 100 is similar to slot 56 in that it defines a circular arc having its center located at the center of shaft 40 of mirror 42.

A guide plate 102 for sheet 92 has a curved upper edge which is attached to the rear edge of slot 100 and is gradually flattened to a relatively straight bottom edge which is suspended over roll 94. A pair of laterally protruding tabs 104 and 106 are folded inwardly so as to capture the sheet 92 between the tabs and the main body of plate 102 so as to maintain the film or paper 92 in an arcuate configuration. A stepping motor 108 mounted in housing 10 adjacent roll 94 has its output shaft operatively connected with a roller 110 which is biased against the rear side of roll 94 by any suitable means so as to enable sequential-stepped advancement of sheet 92 during operation of the transceiver.

A motor drive and sync network 120 is connected to supply operating potential to motor 38 by a lead 122 and is further connected by leads 124 and 126 to the stepping motors 60 and 108, respectively. Network 120 may be of any suitable design and, for example, may include appropriate relays, switches, voltage dividers and the like such that the speed of motor 38 will be synchronously related to the stepping rates of motors 60 and 108. In this manner, regardless of the preselected speed of motor 38, stepping motors 60 and 108 will each be actuated so as to move one increment at the end of each sweep of beams 44 and 90, respectively, and prior to the beginning of the next subsequent sweep. In other words, as mirror 42 is rotated by motor 38, beams 44 and 90 each are repetatively scanned through an arc slightly greater than the width of the send and receiving documents, as determined primarily by the size and number of the side faces of mirror 42. Thus, a particular time interval, hereinafter referred to as the retrace interval, is produced between each pass of the scanning beams across their respective documents, with the duration and frequency of the retrace intervals functionally related with the speed of motor 38. Network 120 is designed to cause motors 60 and 108 to incrementally move only during these retrace intervals in synchronization with the speed of motor 38. Thus, the loss of any information during the scanning operation is effectively precluded. It should also be understood that network 120 may also be designed to regulate the degree of incremental movement of stepping motors 60 and 108 so as to enable selective adjustment of scanning resolution.

The operation of either stepping motor 60 or stepping motor 108 or both is keyed through sync network 120 in response to a signal fed by line 128 from suitable electrical processing and communication equipment 130. In this manner, motor 60 will be actuated only when a message is to be transmitted, and likewise, motor 108 will be actuated only when an incoming or received message is to be recorded.

Equipment 130 is connected by line 132 to receive output signals generated by photodiode assembly 70 and is further connected by line 134 to the input of modulator 80 for supplying incoming signals thereto. It can be appreciated that equipment 130 may take any number of forms depending upon the desired mode of communication which may be contemplated for any of various applications. For example, equipment 130 may include conventional carrier wave communication apparatus in which signals from capsule 70 are modulated onto an appropriate carrier for broadcast, and in similar manner, modulated signals which are received are demodulated or detected and fed to light modulator 80. Of course, any desired communications technique may be employed and further detailed description is omitted for the sake of brevity.

In operation, if it is desired to transmit information contained in a document 48, the transceiver is energized and equipment 130 set in a transmit mode. In the transmit mode, mirror 42 is rotated preferrably in a clockwise direction and sync network 120 is keyed for the energization of the stepping motor 60. Thereafter, network 120 is adjusted so as to drive stepping motor 60 at a rate commensurate with a desired degree of scanning resolution, and document 48 is fed upwardly into housing 10 through slot 46. As the document is fed into the housing, it is engaged by roller 62 and advanced increment-by-increment therethrough. As the document 48 is advanced, it is constrained to an arcuate shape by plates 50 and 58 and circular slot 56.

With mirror 42 rotating and with beam 36 tangentially directed thereagainst, beam 44 is caused to sweep across the document 48 so as to read the same line-by-line. Since the document is held in an arcuate configuration during this time, the length of beam 44 will remain constant so as to maintain its focus with respect to document 48. As the beam 44 sweeps across the document, it will be reflected thereby back along its initial path of travel, against mirror 42 and into lens capsule 30. As exaggerated in FIG. 5, the reflected beam from document 48 will be dispersed somewhat because of the scattering produced by the irregular, non-reflecting surface characteristics of the paper. The dispersed, reflected beam is thereafter focused by lenses 64 and 66 onto photodiode 68. Thus, as beam 44 sweeps across light and dark areas of document 48, the intensity of the reflected beam will be correspondingly varied so as to cause diode 68 to generate an electrical signal on line 132 (FIG. 1) which is representative of the contents of the document. The electrical signal on line 132 from the lens capsule 30 is fed to communication equipment 130 where it is suitably processed for transmission.

Document 48 will continue to advance through housing 10 in this manner until it has been completely "read" by scanning beam 44. Thereafter, it may be removed from the housing and subsequent send documents inserted in similar fashion.

When an incoming message or information is received by equipment 130, it is demodulated and applied via line 134 to light modulator 80. The information is thus applied to beam 78 for producing a modulated light beam 84. Beam 84 is then reflected by mirror 86 so as to angularly approach a side of rotating mirror 42 which, accordingly, sweeps the modulated beam 90 across paper or film sheet 92.

Upon receipt of the incoming message, equipment 130 conditions network 120 to begin operation of stepping motor 108, with the scanning and stepping operation of paper 92 being thus affected in the same manner as heretofore described with respect to document 48. Since beam 90 is modulated in intensity by the incoming signal, and since paper or film sheet 92 is appropriately treated so as to be photosensitive, the received message will be directly printed onto the sheet 92 so as to rapidly record incoming information on the receiving document indicative of the received message. After the complete message has been received, stepping motor 108 will be cutoff by network 120 whereupon only the necessary length of paper or film will have been used.

It can be appreciated that since the read scanning beam 44 and the print scanning beam are each directed separately from opposite sides of mirror 42, no interference therebetween can occur. Thus, both operations, namely the reading of a send document and the printing of a receiving document, can be provided simultaneously even though only one laser source 12 and only one rotating mirror 42 is utilized. This results in numerous advantages such as reduced cost and complexity and enhanced efficiency of operation. Thus, while the laser fascimile transceiver according to the present invention is simple in design and construction, it is considered to represent a material advance in the art especially in providing simultaneous transmission and reception capabilities while necessitating the use of a minimal number of expensive components.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A facsimile transceiver for (a) recording incoming information, (b) transmitting outgoing information or (c) simultaneously recording incoming information and transmitting outgoing information comprising a rotatable polygonal mirror having a plurality of reflecting side surfaces angularly disposed about an axis of rotation, rotating means for rotating the mirror about its axis of rotation, first supporting means for supporting a radiation sensitive receiving document on a first side of the mirror, second supporting means for supporting a send document having outgoing information on a second side of the mirror, generating means for generating first and second beams of radiation, modulating means for modulating the intensity of the first beam, first directing means for angularly directing the first beam against a reflective side surface of the mirror such that the first beam is reflected to the first side of the mirror to be swept across the receiving document when the mirror is rotated, second directing means for angularly directing the second beam against a reflective side surface of the mirror such that the second beam is reflected to the second side of the mirror to be swept across the send document when the mirror is rotated, sensing means for sensing radiation reflected from the send document to generate an outgoing signal representative of the outgoing information of the send document, receiving and transmitting means for (a) operating the modulating means in accordance with incoming signals received by the receiving and transmitting means and (b) transmitting the outgoing signals from the sensing means, sync means responsive to the receiving and transmitting means for operating the rotating means during (a) transmission of signals to transmit outgoing information, (b) receipt of incoming signals to record incoming information or (c) simultaneous receipt of incoming signals and transmission of outgoing signals to simultaneously record incoming information and transmit outgoing information.

said reflecting side surfaces of the mirror being angularly disposed to reflect repetative sweeps of the first and second beams through arcs which are greater than the widths of the send and receiving documents, and means for incrementally moving the send document and the receiving document only when the first and second beams are reflected to the sides of the respective send and receiving documents.

2. A facsimile transceiver for (a) recording incoming information, (b) transmitting outgoing information or (c) simultaneously recording incoming information and transmitting outgoing information comprising a rotatable polygonal mirror having a plurality of reflecting side surfaces angularly disposed about an axis of rotation of the mirror, rotating means for rotating the mirror about its axis of rotation, first supporting means for constraining a radiation sensitive receiving document on a first side of the mirror in a circular arc having its center aligned with the axis of rotation of the mirror, second supporting means for constraining a send document on a second side of the mirror in a circular arc having its center aligned with the axis of rotation of the mirror, laser means for generating a coherent beam of radiation, beam splitting means for splitting the coherent beam of radiation into first and second beams, modulating means for modulating the intensity of the first beam, first directing means for angularly directing the first beam against a reflecting side surface of the mirror such that the first beam is reflected to the first side of the mirror to be swept across the receiving document when the mirror is rotated, second directing means for angularly directing the second beam against a reflecting side surface of the mirror such that the second beam is reflected to the second side of the mirror to be swept across the send document when the mirror is rotated, lens means having a focal axis aligned with the approach path of the first beam to the mirror for focusing reflected radiation from the send document and mirror to a focal point, photoelectric means at the focal point for sensing the reflected radiation, receiving and transmitting means for (a) operating the modulating means in accordance with incoming signals received by the receiving and transmitting means and (b) transmitting the outgoing signals from the photoelectric means, sync means responsive to the receiving and transmitting means for operating the rotating means during (a) transmission of signals, (b) receipt of incoming signals or (c) simultaneous receipt of incoming signals and transmission of outgoing signals, first moving means controlled by the sync means for moving the receiving document parallel to the axis of rotation of the mirror, second moving means controlled by the sync means for moving the send document parallel to the axis of rotation of the mirror, said reflecting side surfaces of the mirror being angularly disposed to reflect repetative sweeps of the first and second beams through arcs which are greater than the arcs in which the send and receiving documents, respectively, are constrained, said first moving means includes means for incrementally moving the receiving document parallel to the axis of rotation of the mirror only when the first beam is reflected to the sides of the receiving document, and said second moving means includes means for incrementally moving the send document only when the second beam is reflected to the sides of the send document.

* * * * *